Sept. 2, 1941.  E. H. WITTENBERG  2,254,557

PRESSURE RETAINER AND RELEASING DEVICE

Filed July 13, 1940

INVENTOR
EDWARD H. WITTENBERG
By Paul, Paul & Moore
ATTORNEYS

Patented Sept. 2, 1941

2,254,557

UNITED STATES PATENT OFFICE 2,254,557

PRESSURE RETAINER AND RELEASING DEVICE

Edward H. Wittenberg, Eau Claire, Wis., assignor to National Pressure Cooker Company, Eau Claire, Wis., a corporation of Wisconsin Application July 13, 1940, Serial No. 345,399

5 Claims. (Cl. 53—2)

This invention relates to new and useful improvements in pressure retaining and releasing devices.

An object of the invention is to provide a simple and inexpensive pressure retainer and releasing device which may be manufactured at small cost and which is efficient and practical in operation.

A further object is to provide in combination with an enclosing casing, a pressure retaining and releasing device comprising a tubular member adapted to be secured to a wall of the casing and having a rubber cap secured to the exposed end thereof in leak-tight relation, thereby to retain normal pressure within the casing, said rubber cap being so secured to the upper end of the member that when excessive pressure develops within the casing, the rubber cap may be blown from said member, thereby to automatically release such excessive pressure.

A further and more specific object of the invention is to provide a pressure releasing device particularly well adapted for use in connection with pressure cookers, comprising a tubular nipple or member having means for securing it to a wall of the cooker as, for example, the usual cover thereof, said tubular member or nipple having an annular peripheral groove adjacent its upper end adapted to receive an inwardly extending annular flange provided on a suitable flexible cap, said cap, when fitted over the upper end of said member, providing a leak-tight closure for the member, when subjected to normal pressures, and said cap being adapted to be blown from the member, when excessive pressure develops within the cooker.

Other objects of the invention reside in the novel construction of the rubber cap, whereby its upper wall is convexed or upwardly curved to such an extent that when the cap is in normal position on the tubular member or nipple secured to the cover of the cooker, the upper wall of the cap is spaced upwardly from the upper end of said member, whereby pressure within the cooker body may readily and conveniently be released therefrom by simply downwardly bending or pressing the upper wall of the cap by a suitable instrumentality, such as a spoon, whereby the cap-securing connection between the cap and said member is partially released.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

Figure 1:
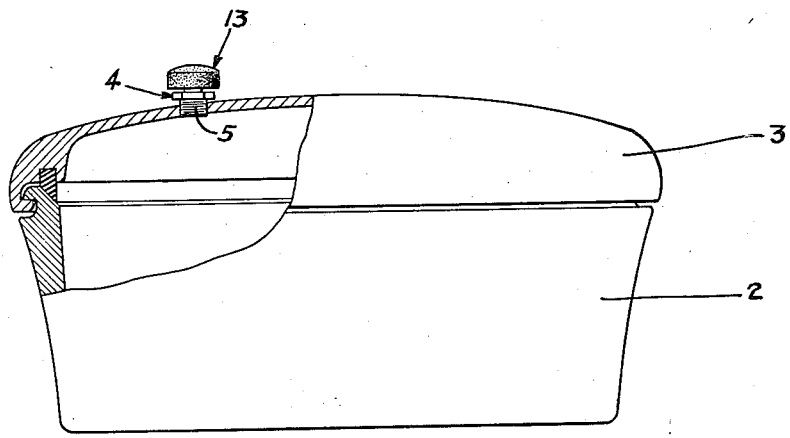
Figure 1 is a side elevation of a pressure cooker showing the invention applied to the cover thereof.

In the selected embodiment of the invention here shown, there is illustrated in Figure 1, for purposes of disclosure, a pressure cooker comprising a body 2 and a cover 3 having means (not shown) for securing it to the cooker body in leak-tight relation.

In pressure cookers, as generally constructed, means is usually provided for automatically releasing the internal pressure thereof, when such pressure becomes excessive. The means now commonly used for thus releasing excessive pressure from a pressure cooker usually resides in metallic release valves, some comprising a spring-actuated check valve, and others a fusible plug which, when subjected to a predetermined temperature, will melt and provide an opening for the escape of pressure from the cooker body.

Figures 2, 3:
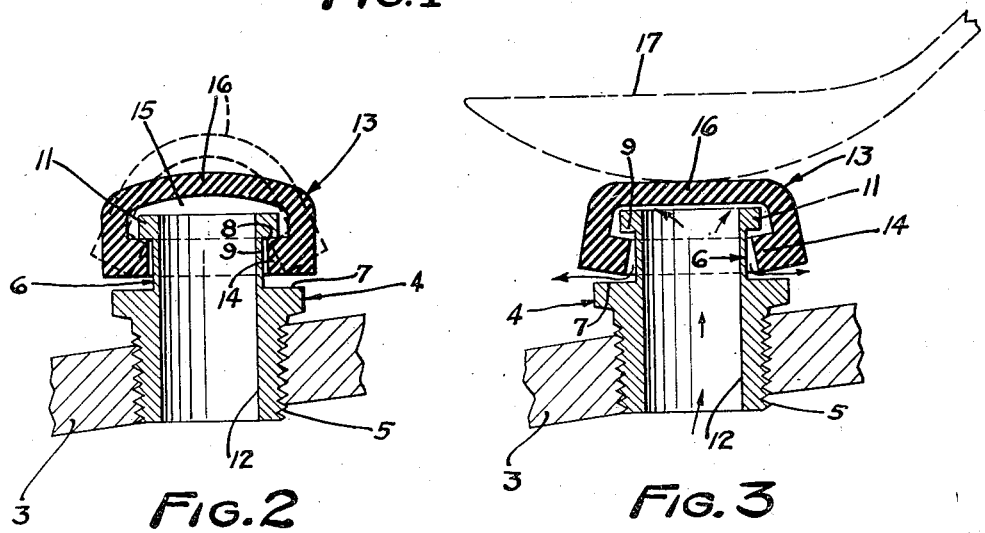
Figure 2 is an enlarged detail sectional view showing the construction of the tubular member or nipple and the rubber cap in normal position thereon.
Figure 3 is a view similar to Figure 2, but showing the upper wall of the cap pressed downwardly to permit pressure within the cooker body to escape therefrom through the tubular member or nipple.

The novel pressure releasing device herein disclosed, is extremely simple and inexpensive in construction. As shown in Figures 2 and 3, it comprises a tubular member or nipple, generally designated by the numeral 4, having a threaded portion 5 adapted to be received in threaded engagement with a socket provided in the cover 3.

The upper end of the member 4 is shown provided with an annular peripheral groove 6, defined by the horizontal parallel walls 7 and 8 and the cylindrical wall 9. By the provision of the annular groove 6 in the upper portion of the member 4, there is provided, in effect, a head 11 at the uppermost end of the member 4.

The member 4, as shown in Figures 2 and 3, has a bore 12, the lower end of which is in direct communication with the interior of the cooker body, as will readily be understood by reference to the drawing. When the cooker is in operation, particularly when used for cooking food under pressure, the opening 12 provided through the member 4, must be closed to prevent the escape of pressure from within the cooker body.

The means provided for thus closing the passage through the member 4, forms an important feature of the present invention and, as shown in Figures 2 and 3, comprises a rubber cap, generally designated by the numeral 13. The cap is provided at its lower end with an inwardly projecting annular flange 14, adapted to be received in the annular groove 6 provided adjacent the upper end of the member 4. The cavity 15 within the cap is enlarged diametrically, as shown in Figures 2 and 3, to receive the head 11 of the member 4. It will also be noted by reference to Figure 2, that the upper wall 16 of the cap 13 is convexed or upwardly curved, whereby the bottom face of said wall is normally spaced upwardly from the upper end or head 11 of the tubular member 4, as best shown in Figure 2.

Under normal operating conditions, the cap 13 is supported on the tubular member or nipple 4, as shown in Figure 2, wherein it will be noted that the upper horizontal face of the flange 14 of the cap is engaged with the horizontal face 8 of the head 11. Such engagement of the rubber cap with the head 11 will prevent pressure leakage from the cooker body through the member 4, when the cooker is operated under normal pressures.

Should the pressure within the cooker body, however, become excessive, the upper wall 16 of the cap may become upwardly distorted by the pressure within the cooker to such an extent that the annular flange 14 of the cap will release its grip on the head 11, whereby the cap may be blown from the cooker. The cap is so designed that it will release its grip on the head 11 of the member 4, when a predetermined pressure is attained.

Another feature of the invention resides in the convexed shape of the top wall 16 of the cap, which makes it possible to release practically all of the pressure from within the cooker body by simply downwardly pressing the upper wall 16 of the cap by means of a suitable instrumentality, such as a spoon 17, indicated in dotted lines in Figure 3. When the top wall 16 is thus downwardly bent, the inherent elasticity of the material from which the cap is made, will cause the flange 14 to become more or less distorted and move away from the walls of the groove 6, whereby a passage is provided between the corresponding walls of the cap and the member 4, through which the steam pressure may escape to the atmosphere from the interior of the cooker body, as shown in Figure 3.

The structure, as hereinbefore stated, is extremely simple and inexpensive in construction, and in actual use, has been found very efficient and practical in operation.

I claim as my invention:

1. In a pressure retainer and release device for automatically releasing excessive pressure from a pressure chamber, a tubular member having one end adapted to be in communication with the pressure chamber, an annular flange at the projecting end of said member, and a flexible sealing element fitting over the projecting end of said member and having means engaging said flange to retain the element in sealing engagement with said member and prevent the release of normal pressure from the chamber through said member, said sealing element being adapted to be expanded by excessive pressure in the chamber whereby the element may become detached from the member and thereby automatically release excessive pressure from the chamber.

2. In combination with a pressure chamber, a hollow member projecting from a wall thereof and having one end in communication with said chamber, the projecting end of said member being open to the atmosphere and provided with a head, and a resilient cap fitting over and interlocked with said head and providing a leak-tight closure for said member, under normal pressure, and said sealing element being adapted to release its grip on said head, when subjected to excessive pressure from within the chamber, thereby to release excessive pressure from the chamber.

3. In combination with an enclosing casing, a tubular member secured to a wall thereof and having an annular flange at its upper end, and a rubber cap adapted to be fitted over said flange to provide a leak-tight closure for said tubular member, said rubber cap having an annular inwardly projecting flange adapted to engage beneath the annular flange of said member whereby said cap is retained on the member under normal pressure, said cap being adapted to be blown from the tubular member by excessive pressure within the casing.

4. In combination with a pressure cooker comprising a body and a cover having means for securing it to said body in seal-tight relation, a pressure retainer and release device secured to said cover and comprising a tubular member which is in direct communication with the interior of the cooker, said member having an annular peripheral groove adjacent one end, and a rubber cap adapted to be fitted over said end and having an inwardly extending annular flange adapted to be received in said groove, thereby to secure the cap to the member in leak-tight relation, said cap being adapted to be distorted by excessive pressure within the cooker body, whereby the cap may be blown from said member when a predetermined pressure is developed within the cooker.

5. In combination with a pressure cooker comprising a body and a cover and means for securing the cover to the cooker body in leak-tight relation, a pressure release device comprising a tubular member having means for securing it to the cover, an annular peripheral groove in the upper portion of said member, a rubber cap having an inwardly extending annular flange adapted to be received in said groove, thereby to secure the cap to the member in leak-tight relation, and said cap having a convexed upper wall which, when pressed downwardly, will cause the annular flange thereof to disengage the walls of said groove, whereby pressure within the cooker body may escape between the cap and said member.

EDWARD H. WITTENBERG.